United States Patent [19]

Teramachi

[11] Patent Number: 4,659,238

[45] Date of Patent: Apr. 21, 1987

[54] LINEAR ROLLER BEARING UNIT

[76] Inventor: Hiroshi Teramachi, 2-34-8, Higashi-Tanagawa, Setagaya-Ku, Tokyo, Japan

[21] Appl. No.: 796,619

[22] Filed: Nov. 8, 1985

[30] Foreign Application Priority Data

Nov. 13, 1984 [JP] Japan .................. 59-237589

[51] Int. Cl.$^4$ ............................ F16C 29/06
[52] U.S. Cl. .................................. 384/44
[58] Field of Search ................ 384/44, 55; 464/168

[56] References Cited

U.S. PATENT DOCUMENTS

| 4,505,521 | 3/1985 | Teramachi | 308/6 C |
| 4,531,788 | 7/1985 | Teramachi | 308/6 C |
| 4,557,532 | 12/1985 | Teramachi | 308/6 C |

Primary Examiner—Lenard A. Footland
Attorney, Agent, or Firm—Kenyon & Kenyon

[57] ABSTRACT

A linear roller bearing unit is disclosed in which a bearing body of channel-like cross section is mounted through rollers on a guide rail for linear motion therealong. The bearing body is formed at the central portion of the inner peripheral surface thereof with a longitudinally extending central groove, and at the opposite side portions of the inner peripheral surface thereof with a pair of longitudinally extending side grooves. The central groove is provided at its bottom surface with a pair of longitudinally extending loaded roller rolling surfaces in face-to-face relation with the corresponding loaded roller rolling surfaces on the guide rail. Each of the side grooves is provided at its bottom surface with a longitudinally extending loaded roller rolling surface in face-to-face relation with the corresponding loaded roller rolling surface on the guide rail. The bearing body further has four non-loaded roller rolling passages formed therethrough. Four rows of rollers are interposed between the opposed loaded roller rolling surfaces on the bearing body and the guide rail. Between the bearing body and the guide rail there are disposed retainers for guiding and holding, in cooperation with the side surfaces of the central and side grooves, the rollers rolling between the opposed roller rolling surfaces.

11 Claims, 33 Drawing Figures

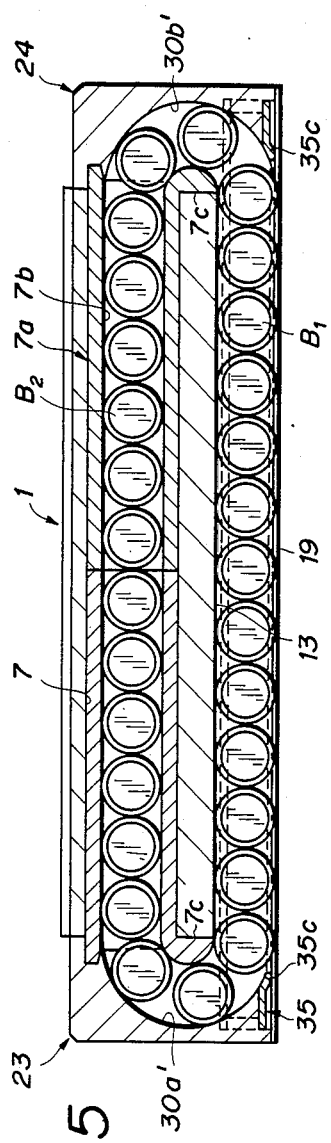
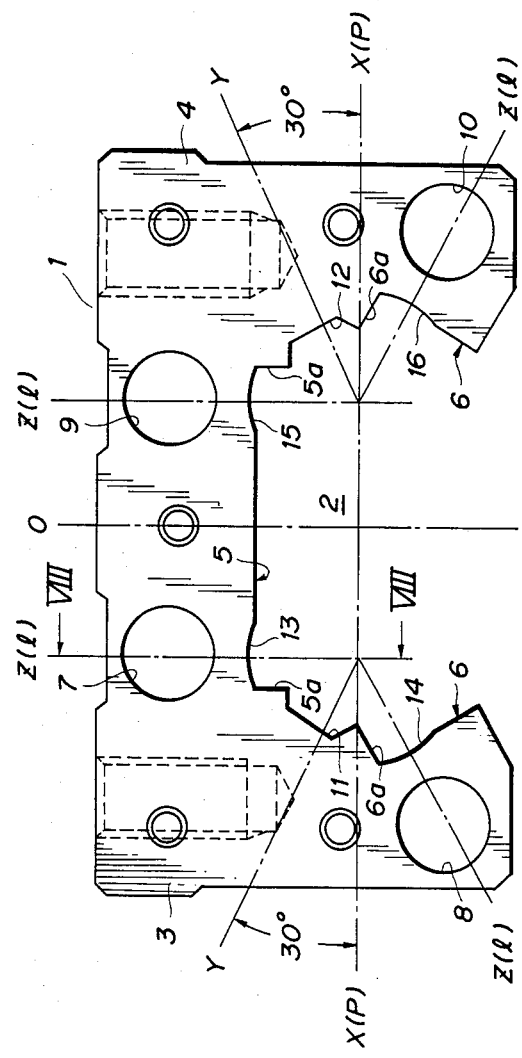
FIG. 5
FIG. 6

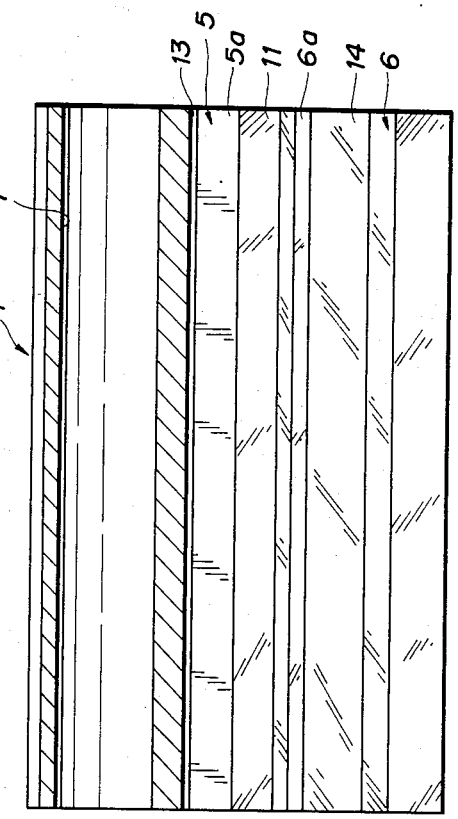
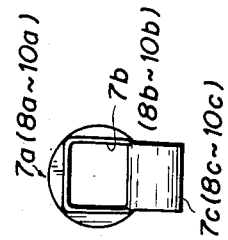
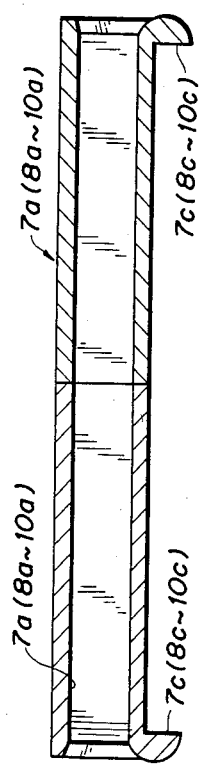

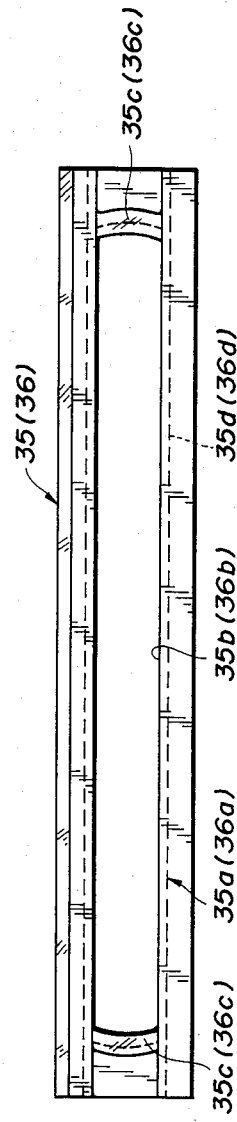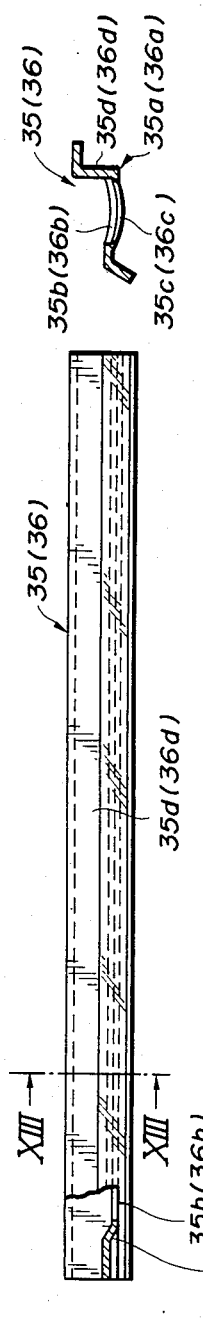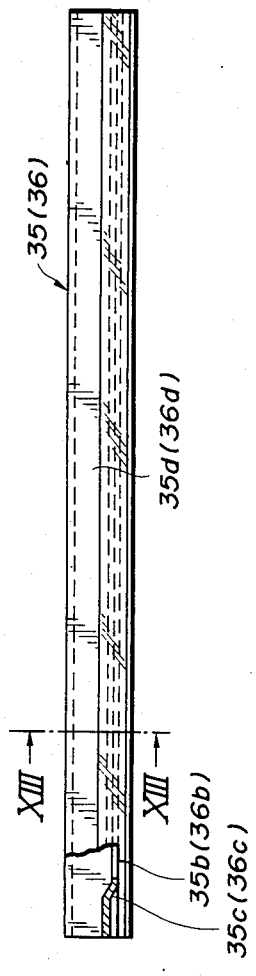

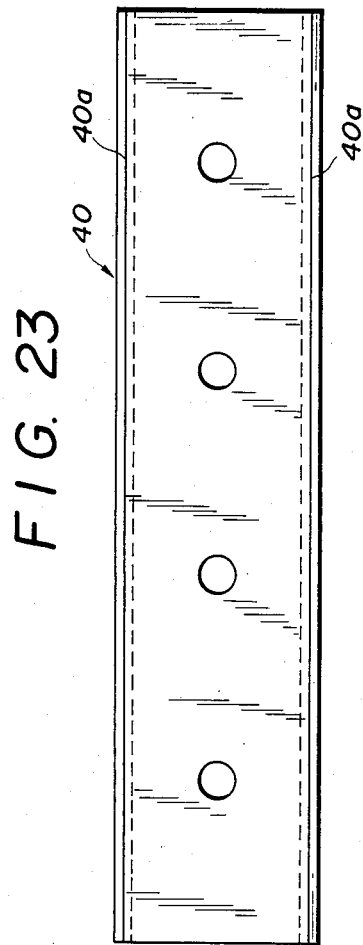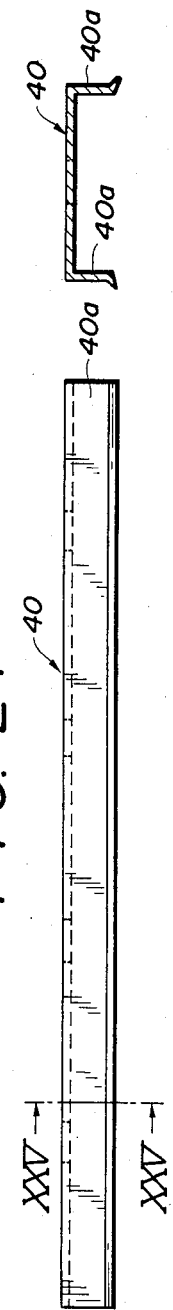

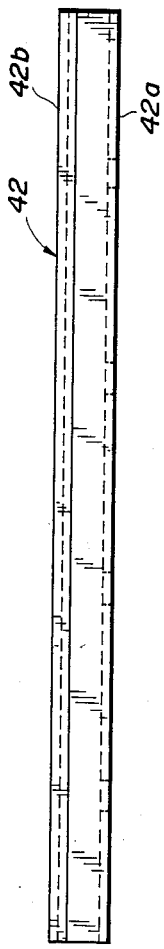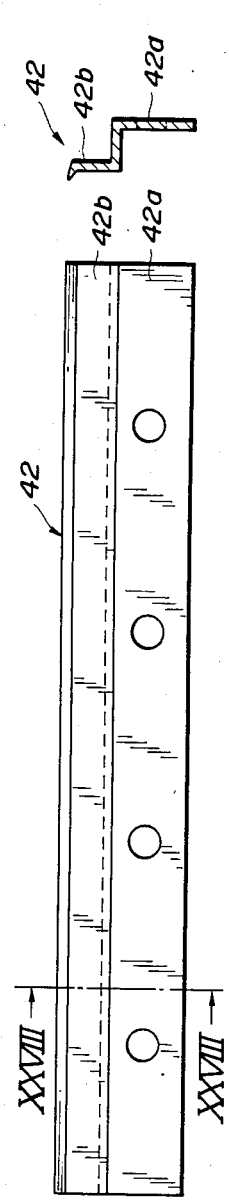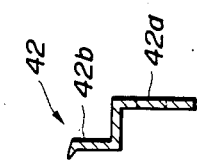
FIG. 26
FIG. 27
FIG. 28

FIG. 29
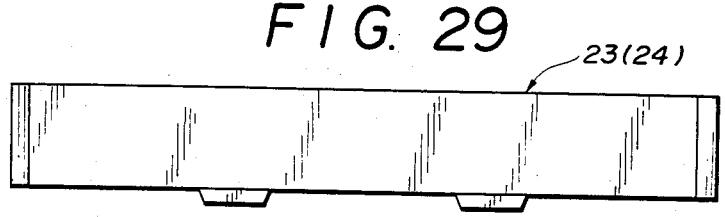
FIG. 30
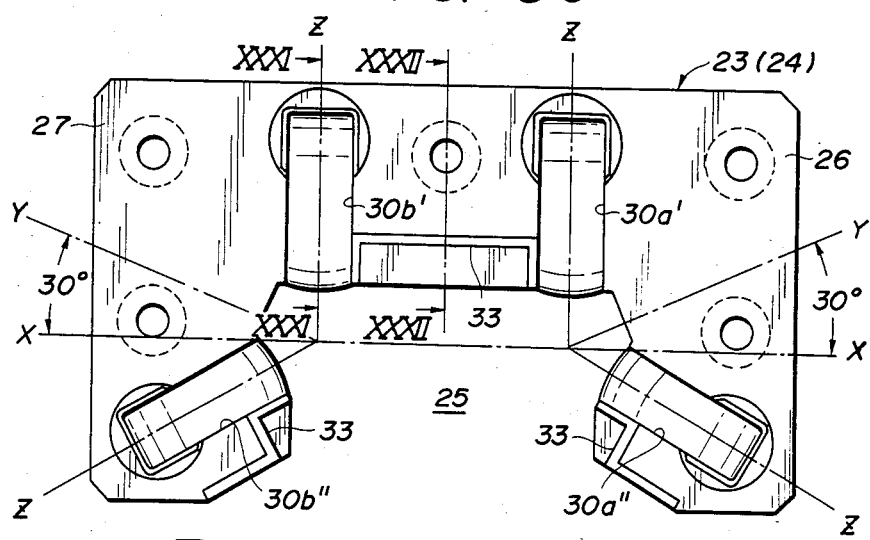
FIG. 31  FIG. 32
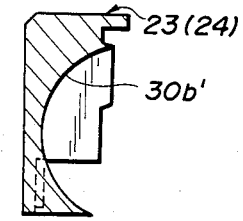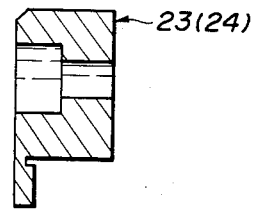

LINEAR ROLLER BEARING UNIT

BACKGROUNG OF THE INVENTION

1. Field of the Invention

The present invention relates to a linear roller bearing unit suitable for use in various sliding parts such as the table saddle of a machine tool, the slider of a machining center and the slider of a transportation robot for reciprocative transportation of a heavy object.

2. Description of the Prior Art

In general, a conventional linear roller bearing unit of this type has been known which is constructed such that a bearing body of channel-like cross section is slidably mounted on a guide rail of substantially trapezoidal cross section through one row of cylindrical rollers, the rollers being disposed between opposed roller rolling grooves in the guide rail and the bearing body and guided by a retainer so that they are prevented from skewing.

The linear roller bearing unit as constructed in the above manner is, however, disadvantageously unable to cope with loads applied in upward and radial directions. In addition, since each roller is in abutting engagement at its opposite sides with the opposed side surfaces of a roller guide slit in the retainer so as to avoid skewing thereof, the configuration of the retainer becomes complicated to make it difficult to fabricate the retainer, and a limited manufacturing error and/or a slight twisting of the retainer causes the rollers to excessively engage or interfere with the side surfaces of the guide slit of the retainer, thereby preventing a smooth rolling of the rollers.

In order to prevent the skew of rollers without the use of a retainer, it is considered that the depth of the roller rolling groove in the bearing body is made larger so as to restrict roller skewings by means of the deepened side surfaces of the roller rolling groove. In this case, however, it is necessary to machine or finish the roller rolling groove with a high degree of precision, thus considerably adding to the cost of production. Also, assembling and disassembling of the entire bearing unit becomes cumbersome and inefficient due to the fact that upon assembling and disassembling, rollers may fall off from the roller rolling groove of the bearing body.

SUMMARY OF THE INVENTION

In view of the above, the present invention is intended to obviate the above-mentioned various problems of the prior art, and has for its object the provision of a novel and improved linear roller bearing unit which is capable of bearing not only loads applied in upward and radial directions but also loads applied in all directions in a satisfactory manner, and in which it is easy to machine or finish the roller rolling grooves in the bearing body, and in which the configuration of the retainers can be simplified for easy and efficient fabrication thereof, thus making it possible to cut down the production cost of the entire bearing unit.

In order to achieve the above objects, according to the present invention, there is provided a linear roller bearing unit comprising: a guide rail having on its opposite sides four loaded roller rolling surfaces; a bearing body adapted to be mounted on the guide rail for linear motion therealong and having a pair of skirt portions depending from the opposite sides thereof with a longitudinally extending central cavity defined therebetween, the bearing body being formed at the central portion of the inner peripheral surface thereof with a longitudinally extending central groove and at the inner peripheral surface of each skirt portion with a longitudinally extending side groove, the central groove being provided at its bottom surface with a pair of longitudinally extending loaded roller rolling surfaces in face-to-face relation with the corresponding loaded roller rolling surfaces on the guide rail, each of the side grooves being provided at its bottom surface with a longitudinally extending loaded roller rolling surface in face-to-face relation with the corresponding loaded roller rolling surface on the guide rail, the bearing body further having four non-loaded roller rolling passages formed therethrough; four rows of rollers interposed between the opposed loaded roller rolling surfaces on the bearing body and the guide rail; and retainer means disposed between the bearing body and the guide rail for guiding and holding, in cooperation with the side surfaces of the central and side grooves, the rollers rolling between the opposed roller rolling surfaces.

The above and other objects, features and advantages of the invention will become clear from the following description of the preferred embodiments thereof when taken in conjunction with the accompanying drawings.

BRIEF DESCRIPTION OF THE DRAWINGS

The accompanying drawings in combination show embodiments of the linear roller bearing unit constructed in accordance with the invention, in which;

FIG. 1 through FIG. 17 show a first embodiment of the linear roller bearing unit of the invention; wherein FIG. 1 is a front elevational view of the general arrangement thereof;

FIG. 2 is a side elevational view of the general arrangement thereof;

FIG. 3 is a cross section taken along the line III—III of FIG. 2;

FIG. 4 is a cross section taken along the line IV—IV of FIG. 3;

FIG. 5 is a cross section taken along the line V—V of FIG. 3;

FIG. 6 is a front elevational view of a bearing body;

FIG. 7 is a plan view of the bearing body;

FIG. 8 is a cross section taken along the line VIII—VIII of FIG. 6;

FIG. 9 is a longitudinal cross section of a tubular member;

FIG. 10 is a front elevational view of the tubular member;

FIG. 11 is a front elevational view of a retainer;

FIG. 12 is a side elevational view of the retainer;

FIG. 13 is a cross section taken along the line XIII—XIII of FIG. 12;

FIG. 14 is a plan view of an end cover;

FIG. 15 is a front elevational view of the end cover;

FIG. 16 is a cross section taken along the line XVI—XVI of FIG. 15; and

FIG. 17 is a cross section taken along the line XVII—XVII of FIG. 15.

FIG. 19 through FIG. 32 show a third embodiment of the linear roller bearing unit of the invention, in which;

FIG. 19 is a cross section similar to FIG. 3;

FIG. 20 is a cross section taken along the line XX—XX of FIG. 19;

FIG. 21 is a cross section taken along the line XXI—XXI of FIG. 19;

FIG. 22 is a front elevational view of a bearing body;

FIG. 23 is a front elevational view of a central retainer;

FIG. 24 is a side elevational view of the central retainer;

FIG. 25 is a cross section taken along the line XXV—XXV of FIG. 24;

FIG. 26 is a front elevational view of a side retainer;

FIG. 27 is a side elevational view of the side retainer;

FIG. 28 is a cross section taken along the line XXVIII—XXVIII of FIG. 26;

FIG. 29 is a plan view of an end cover;

FIG. 30 is a front elevational view of the end cover;

FIG. 31 is a cross section taken along the line XXXI—XXXI of FIG. 30; and

FIG. 32 is a cross section taken along the line XXXII—XXXII of FIG. 30.

DESCRIPTION OF THE PREFERRED EMBODIMENTS

Figure 1:
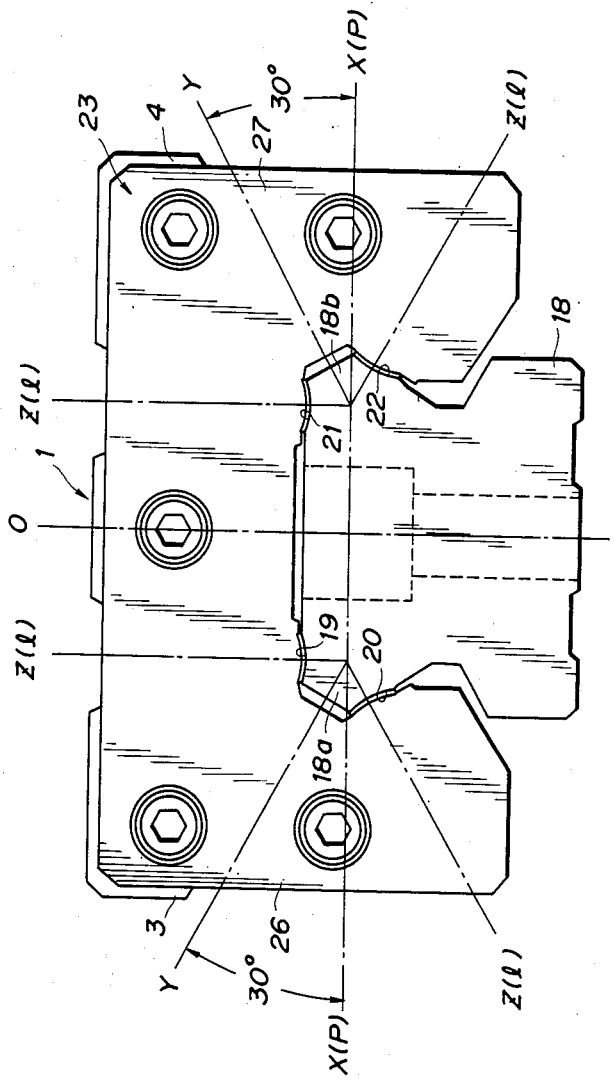
Figure 2:
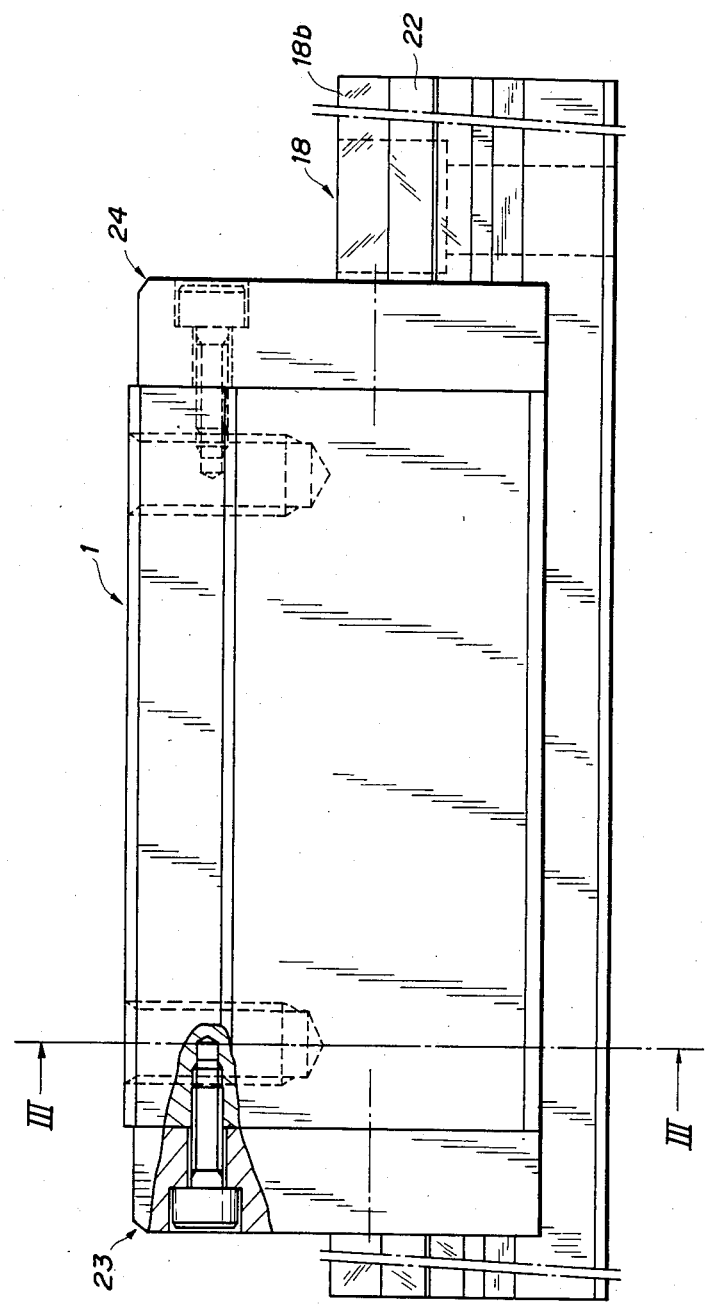

Now, the invention will be described in conjunction with several presently preferred embodiments thereof by referring to the accompanying drawings. In the following description, the same or corresponding parts of the linear roller bearing unit are identified by the same references throughout all the embodiments as illustrated in the drawings.

First, FIGS. 1 through 17 in combination show a first embodiment of the linear roller bearing unit in accordance with the present invention. In FIGS. 1 through 8, reference numeral 1 designates a bearing body which comprises a block member of channel-like cross section having a substantial rigidity. The bearing body 1 is formed of, for example, steel which is easy to cut, machine and effect surface-hardening treatments. The bearing body 1 has a central portion formed at its lower side with a longitudinally extending central cavity 2 of substantially rectangular cross section, and a pair of skirt portions 3, 4 depending from the opposite sides of the central portion with the central cavity 2 defined therebetween.

The bearting body 1 is provided in the central portion and the opposite side portions of the inner peripheral surface thereof with a single central groove 5 and a pair of side grooves 6, 6 respectively, these grooves extending in the longitudinal direction of the bearing body 1 and being disposed in symmetry with respect to the central vertical line of the bearing body 1. Also, formed longitudinally through the solid parts of the skirt portions 3, 4 are four rows of through bores 7 to 10 each of substantially circular cross section larger in diameter than each roller which will be described in detail later. Here, it is to be noted that as shown in FIGS. 3 to 6, the through bores 7 to 10 are disposed in symmetry on lines Z which intersect at an angle of 60 degrees respective reference lines Y—Y each of which forms an angle of 30 degrees with respect to a horizontal load-acting line X—X of a guide rail 18 which will be detailed later.

Figure 3:
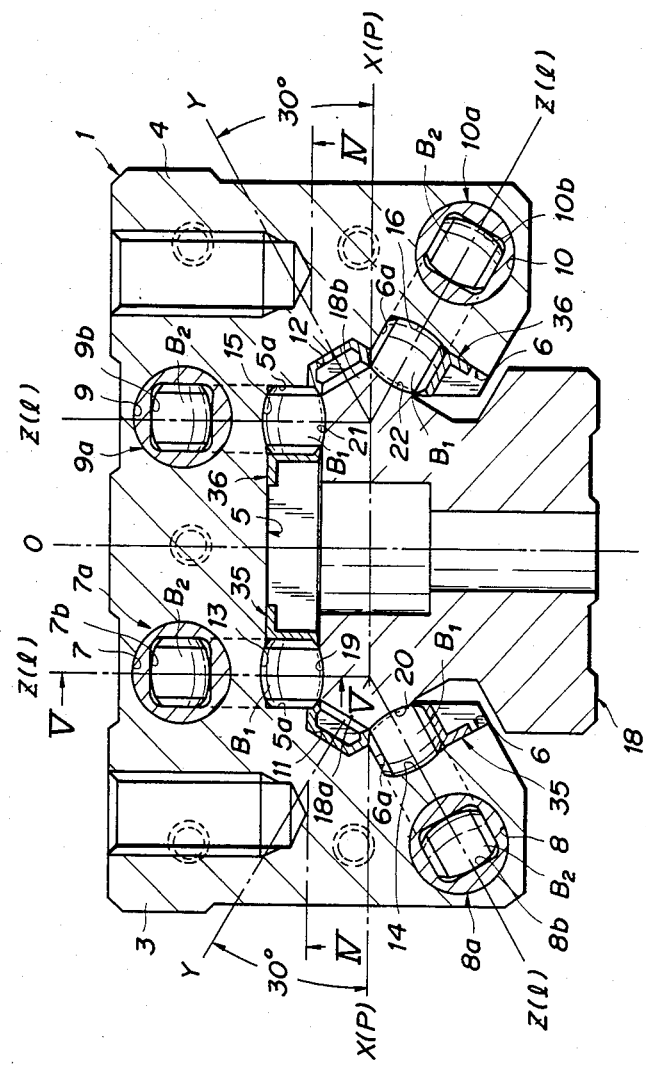
Figure 4:
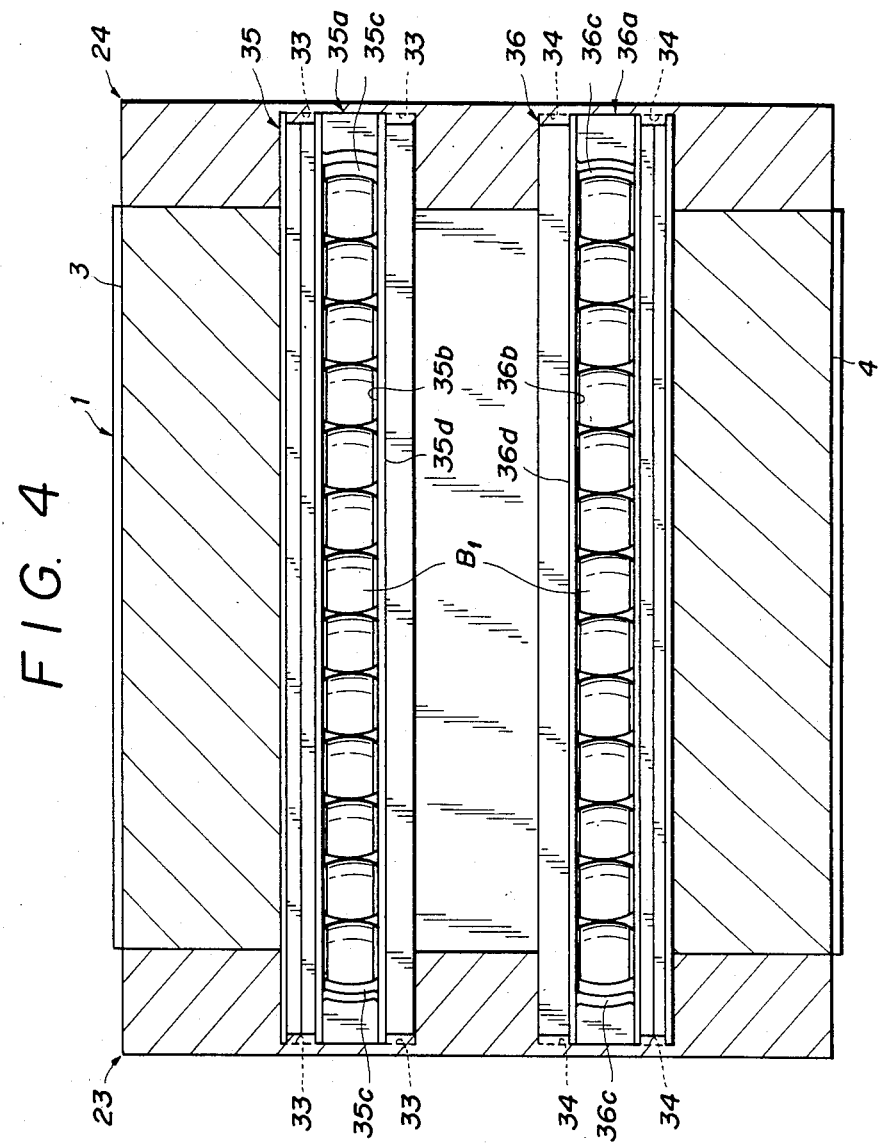
Figure 7:
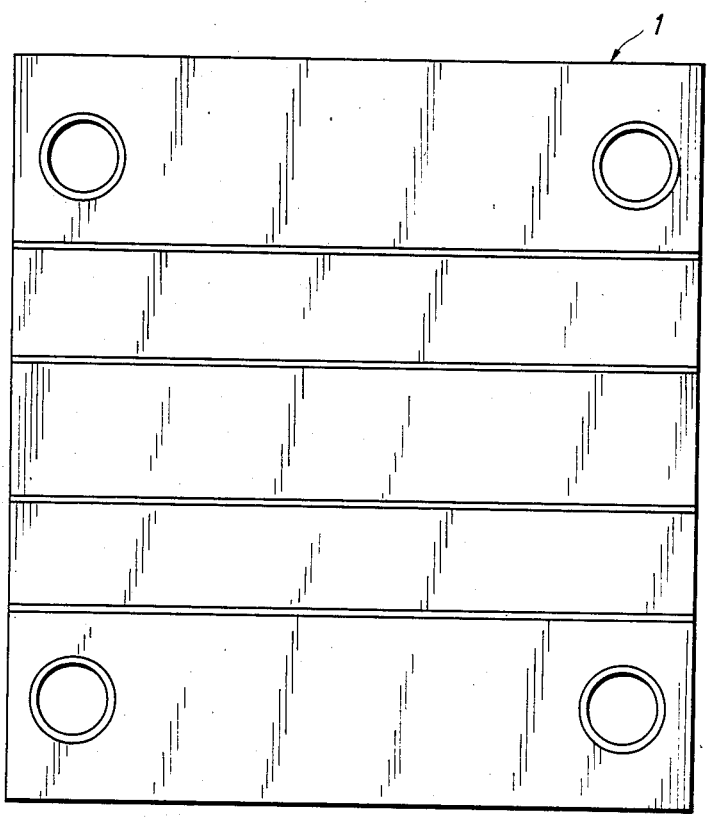
Figure 14:
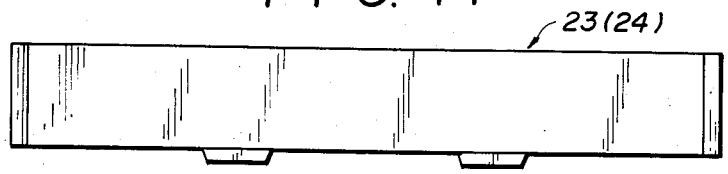
Figure 15:
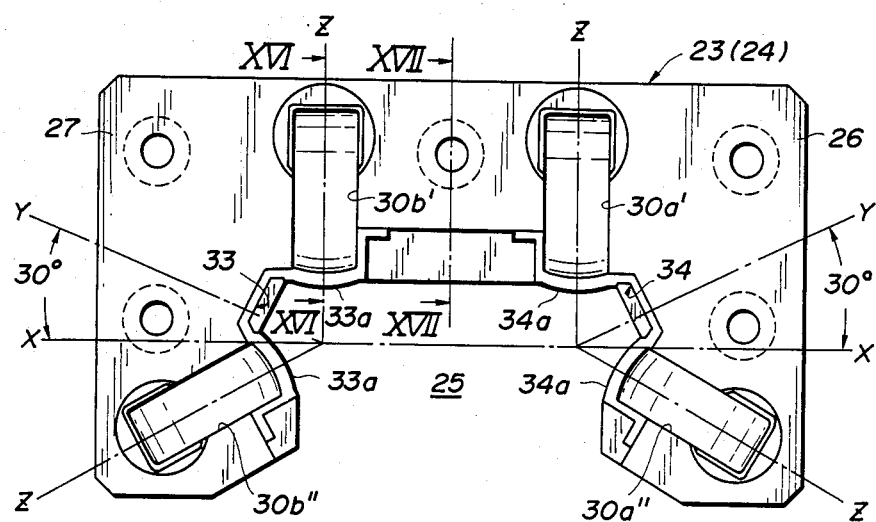
Figures 16, 17:
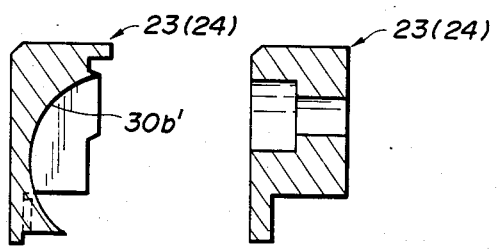

As clearly illustrated in FIGS. 3 and 6, on the bottom surface of the central groove 5 in the bearing body 1 there are longitudinally formed a pair of roller rolling surfaces 13, 15 of circular cross section for rollers under load, these surfaces being spaced apart from each other in the widthwise direction. Each of the side grooves 6, 6 in the bearing body 1 is open at its lower side and has an inclined bottom surface directed in an obliquely upward direction, the inclined bottom surface being provided at its one side with a roller rolling surface 14 or 16 of circular cross section for rollers under load extending in the longitudinal direction of the bearing body 1. In this connection, it should be noted that the opposite side surfaces 5a, 5a of the central groove 5 and one side surface 6a of each side groove 6 serve to guide one end surface of each spherical roller B in the form of a barrel which will be described later, during the rolling of the rollers. Also, the loaded roller rolling surfaces 13 to 16 are disposed in symmetry on the lines Z which intersect at an angle of 60 degrees the reference lines Y—Y which form an angle of 30 degrees with respect to the horizontal load-acting line X—X of the guide rail 18. Further, in the inner peripheral surface of the bearing body 1 between the central groove 5 and the side grooves 6, 6 there are formed two longitudinally extending retainer fitting grooves 11, 12.

Inserted into the respective through bores 7 to 10 in the bearing body 1 are tubular members 7a to 10a which are formed of synthetic resin, aluminum and the like, and which have substantially the same outer peripheral configuration as the cross sectional shape of the through bores 7 to 10. The tubular members 7a to 10a are provided at their inner peripheral surface with roller rolling passages 7b to 10b of substantially rectangular cross section for non-loaded rollers, respectively. As clearly shown in FIGS. 9 and 10, the tubular members 7a to 10a are each divided at their londitudinal center into two halves and have at their opposite ends two tongues 7c to 10c formed integrally therewith, each of the tongues being semi-circular in cross section and substantially rectangular in a front elevational view. These tongues 7c to 10c serve to not only guide a smooth rolling of the spherial rollers B when they move from the loaded roller rolling surfaces 13 to 16 toward the corresponding non-loaded roller rolling passages 7b to 10b or vice versa, but also enable a precise positioning of the non-loaded roller rolling passages 7b to 10b in the tubular members 7a to 10a with respect to the corresponding loaded roller rolling surfaces 13 to 16 when the tubular members 7a to 10a are inserted into the respective through bores 7 to 10 in the bearing body 1. In this regard, it is to be noted that when the bearing body 1 is drilled to form the through bores 7 to 10 each having a diameter slightly larger than the outside diameter of the corresponding one of the tubular members 7a to 10a, it is not necessary to finish the through bores 7 to 10 to close tolerances and hence the working efficiency for forming such through bores is very high. In addition, if the tubular members 7a to 10a are formed of less rigid materal such as, for example, synthetic resin, aluminum or the like than steel, it is possible to practically reduce noises generating during spherical rollers B roll through the non-loaded roller rolling passages 7b to 10b in the tubular members 7a to 10a.

Reference numeral 18 designates a guide rail disposed in the longitudinally extending central cavity 2 of the bearing body 1, the quide rail 18 being adapted to be mounted on a movable or stationary part of a machine tool by use of fastening means such as bolts. As clearly shown in FIGS. 2, 10 and 11, the guide rail 18 has a pair of right and left projections 18a, 18b formed on the opposite sides thereof which are provided at the upper and lower sides thereof with roller rolling surfaces 19 to 22 for rollers under load extending in the axial or longitudinal direction of the guide rail 18 in face-to-face relation with the corresponding loaded roller rolling surfaces 13 to 16 in the central and side grooves 5, 6 and 6. These loaded roller rolling surfaces 13 to 16 and 19 to 22 in combination constitute four rows of rectilinear loaded roller passages. As seen from FIGS. 1 and 3, similarly to the loaded roller rolling surfaces 13 to 16 in the central and side grooves 5, 6 and 6, the loaded roller rolling surfaces 19 to 22 on the guide rail 18 are arranged such that the angles of contact $\alpha_1$, $\alpha_2$ of the loaded rollers $B_1$ with respect to the loaded roller rolling surfaces 19, 21 and 20, 22, i.e. the angles formed by a reference plane P perpendicular to the vertical central line 0 of the bearing body 1 and the contact lines l of the loaded rollers $B_1$, are 90 degrees and 30 degrees, respectively.

Reference character B designates spherical rollers in the shape of a barrel which are interposed between the bearing body 1 and the guide rail 18 for recirculation. The rollers B include loaded rollers $B_1$ rolling under load between the opposed loaded roller rolling surfaces 13 to 16 and 19 to 22 on the bearing body 1 and the guide rail 18, and non-loaded rollers $B_2$ rolling freely within the non-loaded roller rolling passages 7b to 10b in the tubular members 7a to 10a inserted into the through bores 7 to 10 in the bearing body 1. In this connection, it will be appreciated that the difference between the loaded rollers $B_1$ and the non-loaded rollers $B_2$ merely indicates the fact that one and the same rollers are rolling in a loaded region or in a non-loaded region. Also, the curvature of the spherical outer surface of each roller B is set to be slightly greater than that of each of the circular-shaped loaded roller rolling surfaces 19 to 22.

Reference numerals 23, 24 designate a pair of end covers attached to the opposite ends of the bearing body 1 through appropriate fastening means such as bolts, the end covers being fabricated as by the injection molding of a synthetic resin or by the die casting of a metal or alloy. Since both end covers 23, 24 are of identical construction, only one of them, 23, will be described in detail with particular reference to FIGS. 14 to 17, it being understood that the same description applies to the other end cover 24.

The end cover 23 is similar in cross sectional shape to the bearing body 1 and thus has a channel-like cross section. The end cover 23 is provided at its central portion with a central cavity 25 of a substantially rectangular cross section, and a pair of right and left skirt portions 26, 27 depending from the opposite sides thereof with the central cavity 25 defined therebetween. The end cover 23 is provided on its inner side surface with four roller-turning grooves 30a′, 30a″ and 30b′, 30b″ recessed in the outwardly curved manner. Describing in more detail the positional relationship between these roller-turning grooves 30a′, 30a″ and 30b′, 30b″, these grooves are disposed on and extend a certain distance along the lines Z intersecting at an angle of 60 degrees the reference lines Y—Y each of which forms 30 degrees with respect to the load-acting line X—X of the guide rail 18. The starting ends of the respective roller-turning grooves 30a′,30a″ and 30b′, 30b″ correspond to the ends of the associated loaded roller rolling surfaces 13 to 16 and 19 to 22 on the bearing body 1 and the guide rail 18, and the terminating ends of these roller-turning grooves correspond to the ends of the associated non-loaded roller rolling passages 7b to 10b in the bearing body 1.

In short, the respective roller-turning grooves 30a′, 30a″ and 30b′, 30b″ are placed in communication at one end thereof with the loaded roller rolling surfaces 13 to 16 and 19 to 22, and at the other end thereof with the non-loaded roller rolling passages 7b to 10b. Consequently, by means of the end covers 23, 24 of the same construction, the opposite ends of the respective loaded roller rolling surfaces 13 to 16 and 19 to 22 are connected with the opposite ends of the respective non-loaded roller rolling passages 7b to 10b so as to form four rows of closed paths for recirculation of rollers (see FIG. 5).

In the inner side surface of the end cover 23 there are formed two engagement grooves 33, 34 of the same configuration as the cross sectional shape of retainers 35, 36 which will be described later, each of the engagement grooves 33, 34 being shaped into an angled form and having their slant surfaces intersecting the starting ends of the respective roller-turning grooves 30a′, 30a″, 30b′ and 30b″.

Reference numerals 35, 36 designate a pair of right and left retainers of the same construction for guiding the travel of loaded rollers $B_1$. Each of the retainers 35, 36 is formed of a strip of steel bent along the inner peripheral surface of the bearing body 1 and is provided with a longitudinally extending roller-holding portion 35a or 36a of L-shaped cross section with a slit 35b or 36b of a width enough to just prevent falling off of rollers B being formed in the bottom of the roller holding portion. The retainers 35, 36 are each integrally formed at the opposite ends of the slit 35b or 36b with a pair of tongues 35c or 36c which serve the purpose of scooping rollers rolling on the opposed loaded roller rolling surfaces 13 to 16 and 19 to 22 on the bearing body 1 and the guide rail 18 and of transferring the scooped rollers into the roller-turning grooves 30a′, 30a″ and 30b′, 30b″ in the end covers 23, 24 for a smooth change in the travelling direction of rollers from a linear to a curved course. Each of the roller-holding portions 35a, 36a of the retainers 35, 36 is provided with a side wall 35d or 36d which is of substantially the same height as the diameter of each barrel-shaped roller B, the side wall cooperating with the side wall 5a of the central groove 5 or the side wall 6a of each side groove 6 so as to guide the rolling of rollers B and prevent the skewing thereof. The retainers 35, 36 are placed in fitting engagement at their opposite ends with the engagement grooves 33, 34 in the respective end covers 23, 24 so that they are fixedly secured to the end covers. Since the tongues 35c, 36c of the retainers 35, 36 act to lead rollers from the straight-forward direction to the curved direction, as referred to in the foregoing, the mechanical strenght or rigidity of the tongues is very important and hence it is desirable that they are heat treated as by a tufftriding or soft-nitriding treatment for improved rigidity thereof.

In this connection, it is to be noted that when the retainers 35, 36 are fitted to the bearing body 1 and fixed at their opposite ends to the end covers 23, 24, the longitudinal center line of the slit 35b or 36b of each retainer 35 or 36 is alinged with the longitudinal center line of the corresponding one of the loaded roller rolling surfaces 13 to 16 and 19 to 22.

Now, description will be made of the operation of the linear roller bearing unit of the present invention as constructed above. Suppose that the linear roller bearing unit of the invention is incorporated, for example, into a machining center (not shown) with a required machine tool mounted on the bearing body 1. When the bearing unit thus incorporated is moved in either direction along the guide rail 18, the four groups of rollers B held between the opposed loaded roller rolling surfaces 13 to 16 and 19 to 22 on the bearing body 1 and the guide rail 18 are caused to rollingly travel under load while being prevented from skewing by means of the retainers 35, 36. At the trailing end of the bearing unit, the rollers are scooped by the tongues 35c and 36c of the retainers 35 and 36 formed at their one end and thereby directed into the respective roller-turning grooves $30a'$, $30a''$, and $30b'$, $30b''$ in the end cover 24 so as to be changed in the travelling direction from the linear to the circular or curved path. From the roller-turning grooves, the rollers B move into the non-loaded roller rolling passages 7b to 10b in the bearing body 1, where the rollers B get rid of load. In this regard, it will be appreciated that the particular arrangement of the roller-turning grooves formed along the contact lines of the loaded rollers $B_1$ provides a very smooth turning of the rollers without causing any side slippage. Subsequently, the rollers $B_2$ free of load travelling along the non-loaded roller rolling passages 7b to 10b move into the roller-turning grooves $30a'$, $30a''$ and $30b'$, $30b''$ in the other end cover 23 at the leading end of the bearing body 1 and are caused to change their tavelling direction from the linear to circular or curved path, from where the rollers return to the loaded roller passages defined between the opposed loaded roller rolling surfaces 13 to 16 and 19 to 22 on the bearing body 1 and the guide rail 18, where the rollers are again placed under load. Thereafter, the same operation will be repeated for aligned recirculation of the rollers.

Although in the above description of the embodiment, the non-loaded roller passages 7b to 10b are defined by the inner peripheral sufraces of the respective tubular members 7a to 10a, they may be formed by directly drilling through the bearing body 1.

Figure 18:
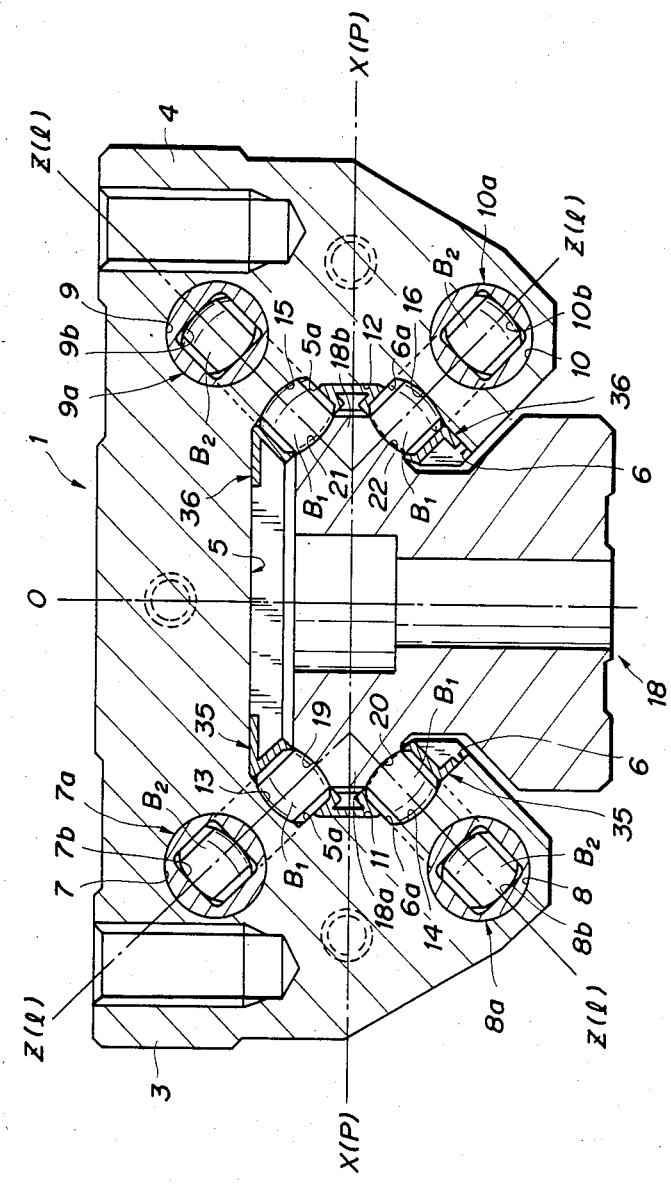
FIG. 18 is a cross section similar to FIG. 3, showing a second embodiment of the linear roller bearing unit of the invention.
Figure 19:
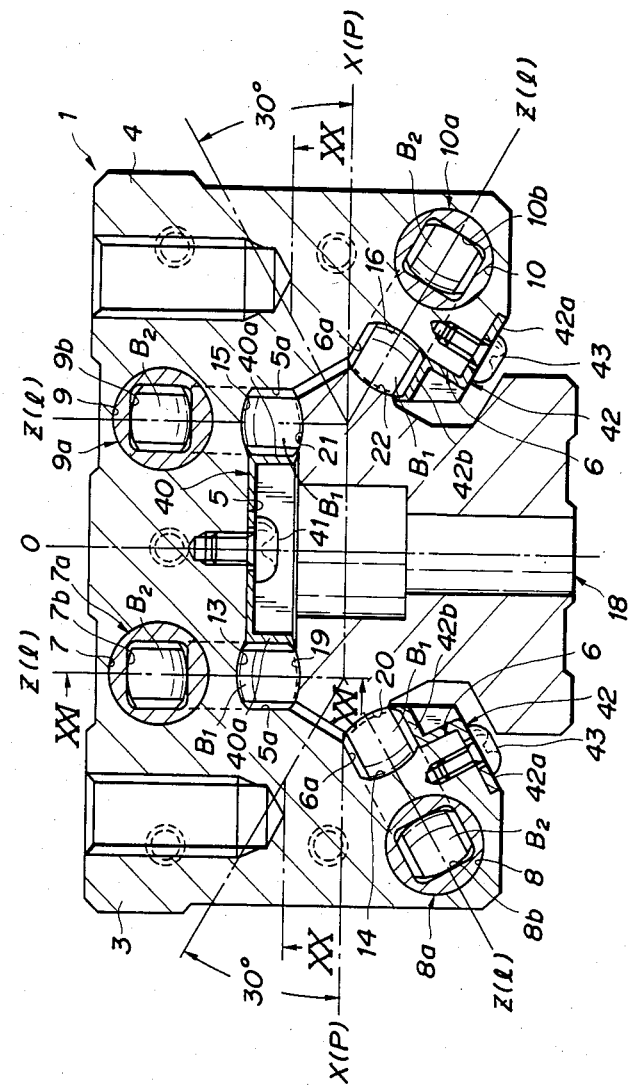
Figure 20:
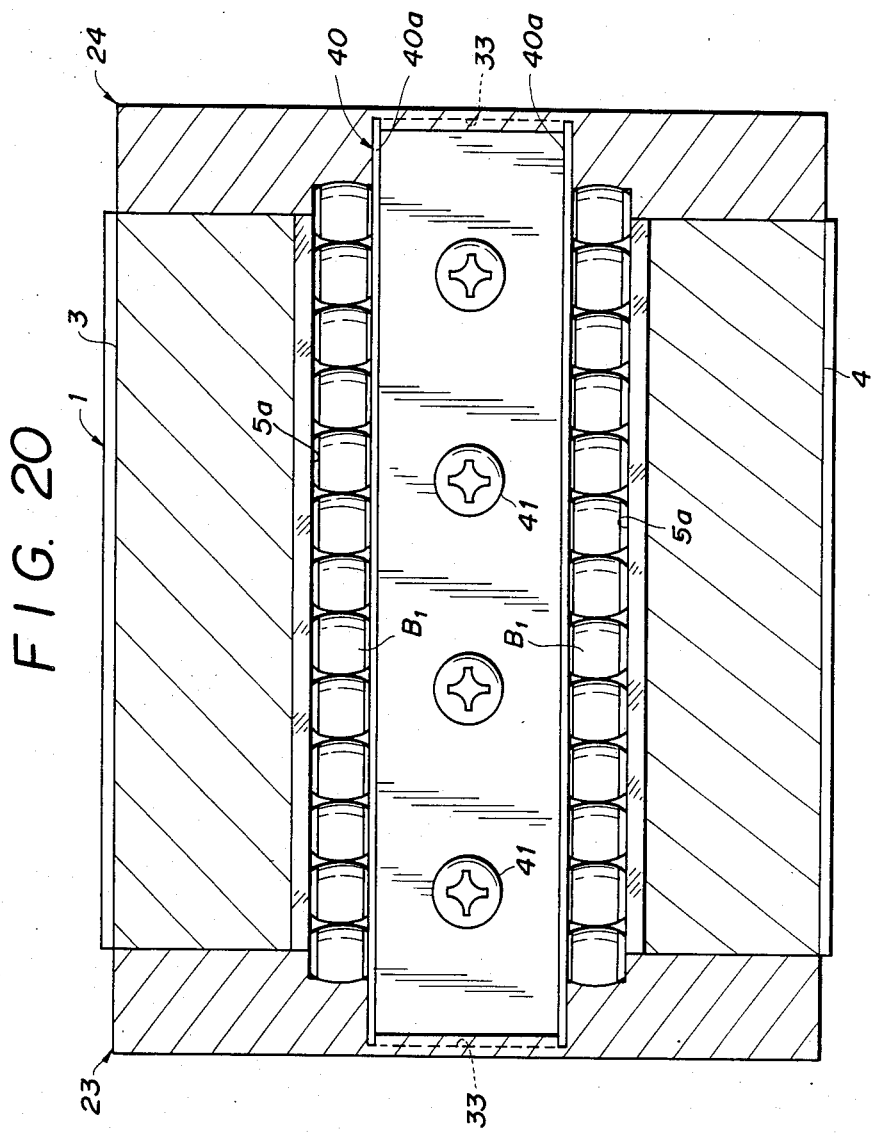
Figure 21:
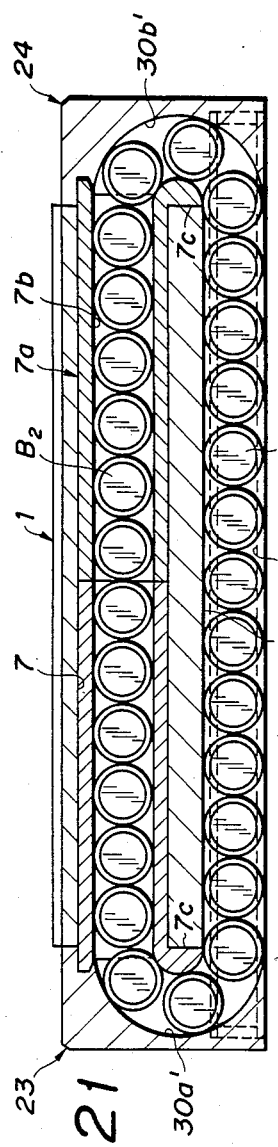
Figure 22:
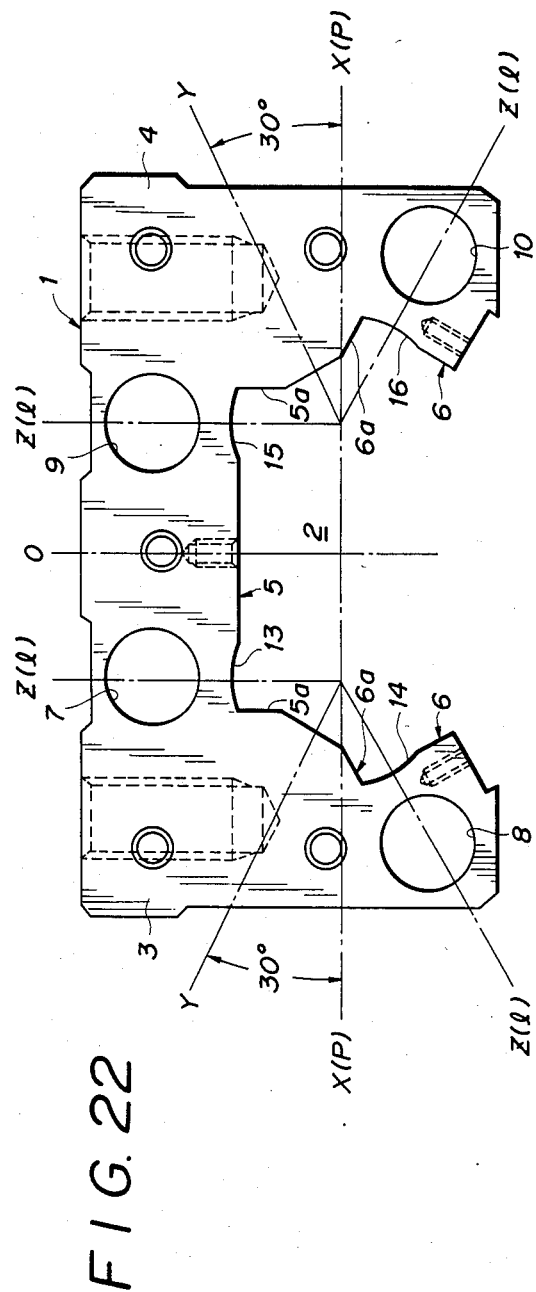

FIG. 18 illustrates a second embodiment of the linear roller bearing unit in accordance with the present invention. In this embodiment, the roller rolling surfaces 13 to 16 on the bearing body 1 and the roller rolling surfaces 19 to 22 on the guide rail 18 are all disposed in symmetry on lines Z intersecting at an angle of 45 degrees the horizontal load-acting line X—X of the guide rail 18 so that the angles of contact $\beta_1$, $\beta_2$ of the rollers $B_1$ under load with respect to the loaded roller rolling surfaces 13 to 16 and 19 to 22, i.e. the angles formed by the contact lines 1 of the loaded rollers $B_1$ and a reference plane P perpendicular to the vertical center line 0 of the bearing body 1, is set to be about 45 degrees, and the through bores 7 to 10 in the bearing body 1 are also disposed in symmetry on lines Z intersecting the load-acting line X—X of the guide rail 18 at an angle of 45 degrees. The construction and operation of the second embodiment other than the above are substantially similar to those of the first embodiment, and thus the detailed description thereof has been omitted.

FIGS. 19 to 32 illustrate a third embodiment of the linear roller bearing unit in accordance with the present invention, in which the configuration of the retainers is considerably simplified as compared with that of the above-described first embodiment. Specifically, fixedly secured by means of fastening screws 41 to the inner peripheral surface of the central groove 5 in the bearing body 1 is a longitudinally extending central retainer 40 of channel-like cross section which is bent at right angles at its opposite sides to provide a pair of upright side surfaces 40a which serve, in cooperation with the side surfaces 5a of the central groove 5, to guide and hold in place two rows of rollers $B_1$ under load. On the other hand, two side retainers 42, each being bent in a stepwise fashion to form a Z-shaped cross section, are fixedly secured at their one longitudinally extending one side surface 42a as by fastening screws 43 to the inner peripheral side surfaces of the bearing body 1 adjacent the open sides of the respective side grooves 6 so that the other side surface 42b of the respective retainers 42 cooperates with the one side surface 6a of the respective side grooves 6 to guide and hold the rollers $B_1$ under load. The construction and operation of the third embodiment other than the above are substantially similar to those of the aforementioned first embodiment and hence the detailed description thereof has been omitted.

Figure 33:
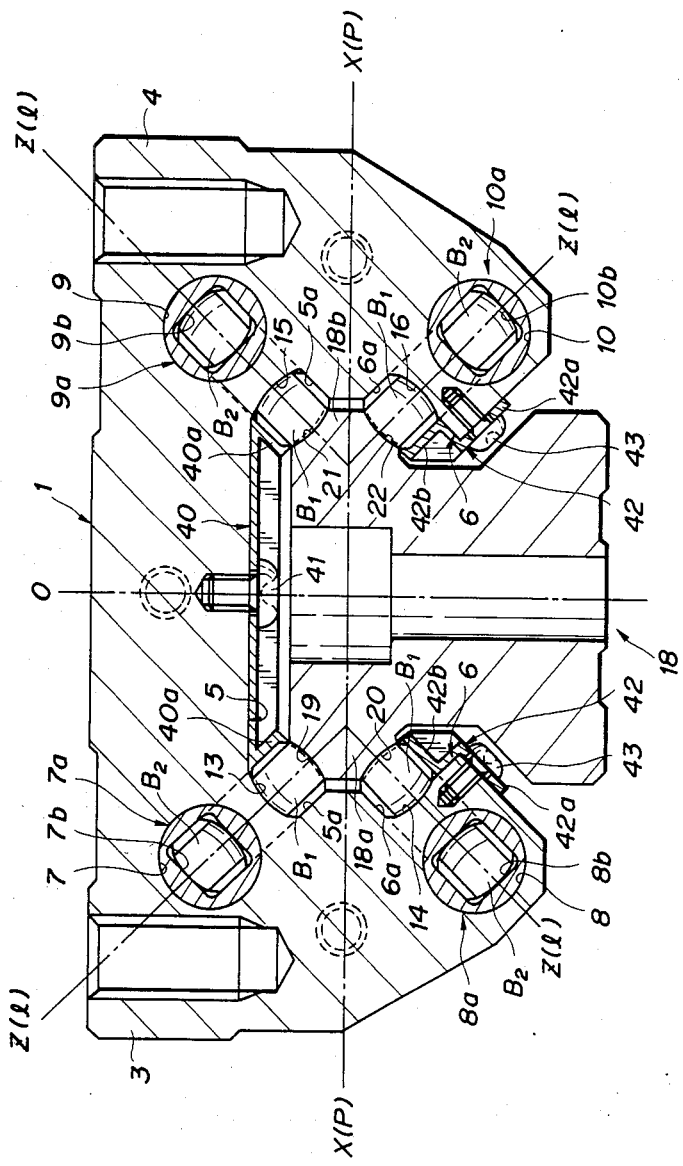
FIG. 33 is a cross section similar to FIG. 19, showing a fourth embodiment of the linear roller bearing unit of the invention.

FIG. 33 illustrates a fourth embodiment of the linear roller bearing unit in accordance with the present invention. In this embodiment, the loaded roller rolling surfaces 13 to 16 on the bearing body 1 and the loaded roller rolling surfaces 19 to 22 on the guide rail 18 are disposed in symmetry on lines Z intersecting the load-acting line X—X of the guide rail 18 at an angle of 45 degrees so that the angles of contact $\beta_1$, $\beta_2$ of loaded rollers $B_1$ with respect to the loaded roller rolling surfaces 13 to 16 and 19 to 22, i.e. the angles formed by the contact lines 1 of the loaded rollers $B_1$ and the reference plane P perpendicular to the vertical center line 0 of the bearing body 1, is set to be about 45 degrees. Also, the through bores 7 to 10 in the bearing body 1 are disposed in symmetry on the lines Z intersecting the load-acting line X—X of the guide rail 18 at an angle of 45 degrees. The construction and operation of the fourth embodiment other than the above are substantially similar to those of the above-mentioned third embodiment and thus the further description thereof has been omitted.

As will be apparent from the foregoing description, the linear roller bearing unit of the present invention having the construction and operation as set forth above provides the following various advantages.

The linear roller bearing unit of the invention is able to satisfactorily support or withstand all loads acting thereon in the upward and radial directions as well as in every direction under the action of two rows of rollers interposed between two loaded roller rolling surfaces in the central groove in the bearing body and the corresponding loaded roller rolling surfaces on the guide rail, and two rows of rollers interposed between two loaded roller rolling surfaces in the opposite side grooves in the bearing body and the corresponding loaded roller rolling surfaces on the guide rail. Further, due to the fact that the rollers are guided and held by the retainers disposed between the bearing body and the guide rail in combination with the side surfaces of the central groove and the one side surface of each of the two side grooves, it is not necessary to machine or finish the central and side grooves to such high tolerances as would be required in the case wherein rollers are guided and held between the opposite side surfaces of each groove, as a consequence of which it becomes easy to fabricate these grooves, thus improving the working efficiency in forming such grooves and cutting down the manufacturing costs to a material extent. Also, it is possible to not only simplify the configuration of each retainer but also reduce the required rigidity thereof as compared with the case wherein rollers are guided and held by the use of retainers alone so that the retainers can be fabricated readily at reduced cost. Moreover, since the non-loaded roller rolling passages in the bearing body are disposed on the contact lines of the rollers rolling on the opposed loaded roller rolling surfaces, there will be no side slippage of the rollers when they move from the loaded roller rolling surfaces to the non-loaded roller rolling passages or vice versa so that the rollers can make a smooth change in their travelling direction without being subjected to any excessive loads, thereby improving the durability of the rollers to a substantial extent.

It will, of course, be understood to the skilled in the art that various changes and modifications may be made in the form, details, arrangements, and proportions of the parts to conform to the specific requirements of use, without departing from the scope of the invention as set forth in the appended claims.

What is claimed is:

1. A linear roller bearing unit comprising:
   a guide rail having on its opposite sides four loaded roller rolling surfaces;
   a bearing body adapted to be mounted on said guide rail for linear motion therealong and having a pair of skirt portions depending from the opposite sides thereof with a longitudinally extending central cavity defined therebetween, said bearing body being formed at the central portion of the inner peripheral surface thereof with a single longitudinally extending central groove and at the inner peripheral surface of each skirt portion with a longitudinally extending side groove, said single central groove being provided at its bottom surface with a pair of longitudinally extending loaded roller rolling surfaces in face-to-face relation with the corresponding loaded roller rolling surfaces on said guide rail, each of said side grooves being provided at its bottom surface with a longitudinally extending loaded roller rolling surface in face-to-face relation with the corresponding loaded roller rolling surface on said guide rail, said bearing body further having four non-loaded roller rolling passages formed therethrough;
   four rows of rollers interposed between the opposed loaded roller rolling surfaces on said bearing body and said guide rail; and
   retainer means interposed between said bearing body and said guide rail for guiding and holding, in cooperation with the side surfaces of said central and side grooves, said rollers rolling between the opposed roller rolling surfaces.

2. A linear roller bearing unit as set forth in claim 1, wherein said bearing body has four through bores longitudinally formed therethrough into which are inserted four tubular members, said non-loaded roller rolling passages in said bearing body being each constituted by the inner peripheral surface of each of said tubular members.

3. A linear roller bearing unit as set forth in claim 2, wherein said through bores in said bearing body are disposed on contact lines of said rollers with respect to the associated loaded roller rolling surfaces.

4. A linear roller bearing unit as set forth in claim 3, wherein said loaded roller rolling surfaces on said bearing body and said guide rail are disposed in symmetry on lines which intersect at an angle of 60 degrees reference lines each of which forms an anlge of 30 degrees with respect to a horizontal load-acting line of said guide rail.

5. A linear roller bearing unit as set forth in claim 4, wherein said through bores in said bearing body are disposed in symmetry on lines which intersect an anlge of 60 degrees reference lines each of which forms an angle of 30 degrees with respect to a horizontal load-acting line of said guide rail.

6. A linear roller bearing unit as set forth in claim 3, wherein said loaded roller rolling surfaces on said bearing body and said guide rail are disposed in symmetry on lines which intersect at an angle of 45 degrees a horizontal load-acting line of said guide rail.

7. A linear roller bearing unit as set forth in claim 6, wherein said through bores in said bearing body are disposed in symmetry on lines which intersect at an angle of 45 degrees a horizontal load-acting line of said guide rail.

8. A linear roller bearing unit as set forth in claim 2, wherein said tubular members are formed of a synthetic resin.

9. A linear roller bearing unit as set forth in claim 2, wherein said tubular members are formed of aluminum.

10. A linear roller bearing unit as set forth in claim 2, wherein said tubular members are each provided at the opposite ends thereof with a pair of positioning tongues for precisely positioning each tubular member relative to said bearing body upon insertion of said tubular members into the corresponding through bores in said bearing body.

11. A linear roller bearing unit as set forth in claim 2, wherein each of said tubular members is divided at its longitudinal center into two halves.

* * * * *